May 23, 1933.  F. PIZZINI  1,910,857

ADJUSTABLE THRUST BEARING

Filed Feb. 13, 1932

Frank Pizzini
INVENTOR.

Patented May 23, 1933

1,910,857

UNITED STATES PATENT OFFICE

FRANK PIZZINI, OF SAN ANTONIO, TEXAS

ADJUSTABLE THRUST BEARING

Application filed February 13, 1932. Serial No. 592,714.

It is highly desirable for certain classes of machinery, such as grinders, pulverizers, etc. to have a thrust bearing, taking the end thrust of the moving parts, equipped with an adjustment to provide for the wear incident to operation, and to give an accurate spacing of the grinding means for any desired fineness of the product and a means for easily maintaining said spacing.

This is particularly desirable where the grinding or pulverizing means is of a highly wearable material, such as the stones in a grinding machine.

The object of this invention is to provide a readily adjustable mounting for a thrust bearing which may be run at a comparatively high speed and hold the shaft in a fixed longitudinal spacing which shall insure a definite and positive contact or a definite and positive spacing between the two or more surfaces which are set at right angles to the shaft.

A further object of this invention is to provide a simple, cheap and readily manufactured thrust bearing mounting which shall take the thrust of a grinding wheel and which shall be readily adjustable to the degree of fineness required.

Referring to the single drawing.

Figure 2:
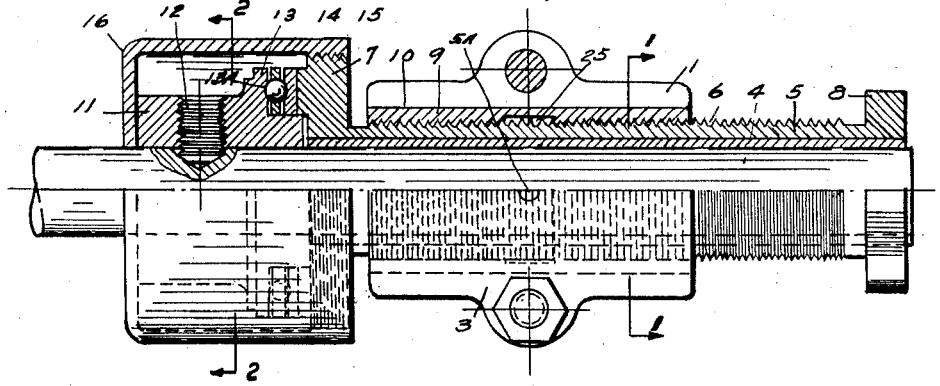
Fig. 2 is an enlarged horizontal half section of the bearing and adjusting mechanism of the adjustable thrust bearing shown mounted on a portion of the grinding wheel shaft.
Figure 3:
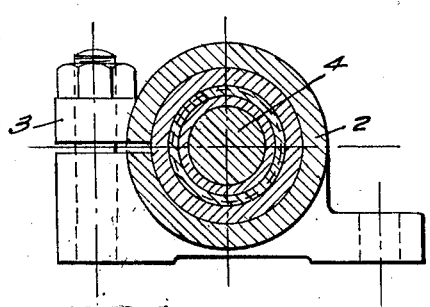
Fig. 3 is a section on line 1—1.
Figure 4:
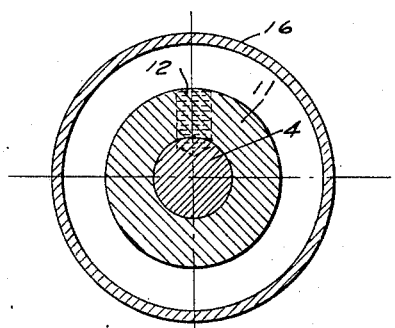
Fig. 4 is a section on line 2—2.
Figure 1:
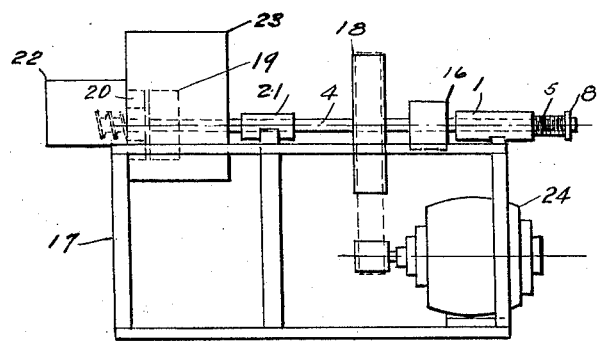
Fig. 1 is an elevation of a grinding machine.

A bearing housing 1 is mounted on a suitable portion of the frame 17, as is shown in the drawing. This bearing housing 1 may be of the solid type 2 or with a base and cap 3. A shaft 4 carries on its outer surface a sleeve 5 formed as a threaded portion 6, a similarly threaded enlarged disc 7 ending on the opposite end an enlarged disc 8 which may be corrugated, knurled or provided with holes for spanner or other means for turning said disc 8. The threaded sleeve 5 is mounted in an exteriorly deposed sleeve 9.

The bearing housing 1 in practice is a casting with bore 10. This bore 10 may be machined and the exteriorly deposed sleeve 9 which is threaded on the interior portion may be pressed in place or the bearing housing 10 may be left in a rough unfinished condition and a soft metal such as babbitt, lead or a similar metal may be heated and poured around the exteriorly threaded sleeve 5 which provides a thread on the interior of the exteriorly deposed sleeve 10. An oil pocket 25 is provided to supply lubricant to the interior of sleeve 5 thru holes 5A.

The disc 8 shown on the right end of exteriorly threaded sleeve 5 may be integral with exteriorly threaded sleeve 5 as shown in the drawing or may be a separate piece rigidly fastened to said exteriorly threaded sleeve 5.

The same condition exists and the same means of fastening and holding the enlarged disc 7 to exteriorly threaded sleeve 5.

Collar 11 is rigidly held to shaft 4 by setscrew 12 set in a recess in shaft 4 as shown in the drawing. This collar 11 is provided with an enlarged portion 13 in which a groove is turned. This groove acts as a ball race which complements the ball carrying ball race 14 of a ball thrust bearing and against the thrust race 15 which contacts with disc 7 completing the thrust arrangement. The thrust exerted in an outwardly direction through shaft 4 is transmitted to collar 11 through setscrew 12 and through the ball race 14 and the ball thrust race 15 through disc 7 and sleeve 5 thru the threaded portion 6 into the interiorly threaded sleeve 9 and thence to the frame 17 through the bearing housing 1.

An interiorly threaded housing 16 mounted on the threaded portion of disc 7 protects the ball thrust bearing 13, 14 and 15 and shoulders against the end of collar 11 holding said ball thrust bearing parts 14 and 15 spaced between shoulders 13 and disc 7 and prevents any longitudinal movement in a direction the reverse of the thrust action.

The frame 17 supports bearing housing 1 and shaft 4, on which is mounted the adjustable ball thrust bearing as heretofore described, a pulley 18 and a grinding wheel 19 rigidly attached to shaft 4. A bearing 21 supports the grinding wheel 20 which is rigidly attached to hopper 22 and frame 17.

Shaft 4 is driven by a conventional means, such as a belt from a line shaft or preferably a motor 24 mounted on frame 1 making a self contained unit. Any desired type of drive may be used to get the desired rotative speed in shaft 4.

The above description embodies the use of a portion of a commercial ball thrust bearing with a groove 13A cut in the enlarged portion 13 of collar 11. This groove may be omitted and a ball thrust race similar to ball thrust race 15 may be substituted. This specification and accompanying drawing calls for and shows a ball thrust bearing. I reserve the right to use a plain thrust bearing, a roller thrust bearing or any desired type of thrust bearing.

A rotative movement of disc 8 about the axis of shaft 4 carries sleeve 5 in a forwardly directed motion, which thru the ball thrust bearing 13, 14 and 15, collar 11 and shaft 4 advances grinding wheel 19 toward grinding wheel 20, until the desired spacing between said grinding wheels 19 and 20 is obtained. The reaction of the material being ground forces grinding wheel 19 away from grinding wheel 20 and this force is transmitted to and thru the ball thrust bearing 13, 14 and 15 to disc 7 and sleeve 5 and threaded portion 6 to bearing housing 1 and thence to frame 17.

It is to be understood that I may make changes in the construction and in the combination and arrangement of the several parts provided that such changes fall within the scope of the appended claim.

I claim:

An adjustable thrust bearing, of a ball or roller type; a bearing housing rigidly attached to a frame, an exteriorly threaded sleeve functioning in an interiorly threaded portion of said bearing housing, a shaft mounted in and revolving in said exteriorly threaded sleeve and supported on opposite end by a bearing; said exteriorly threaded sleeve having a disc on one end for rotating said sleeve in said bearing and a threaded disc on the opposite end, a collar fixed longitudinally on said shaft and a thrust bearing mounted between said collar and said threaded disc and a dust tight interiorly threaded housing screwed on to the threaded disc holding said collar and shaft against undesired end movement.

FRANK PIZZINI.